Figure 1:
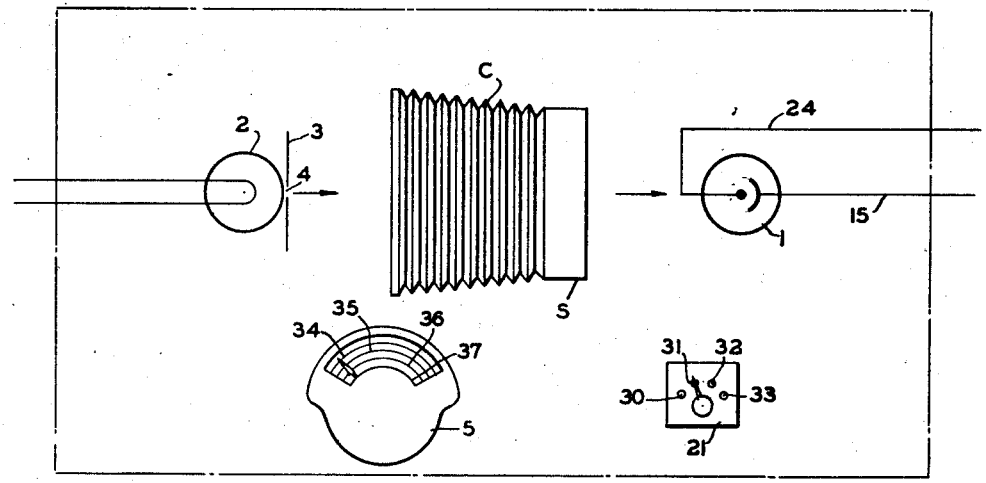

Oct. 28, 1941.   W. A. WEISS   2,261,010
MEASURING DEVICE
Filed Aug. 4, 1940

INVENTOR.
WALTER A. WEISS
BY *John H. Leonard,*
HIS    ATTORNEY

Patented Oct. 28, 1941

2,261,010

UNITED STATES PATENT OFFICE 2,261,010

MEASURING DEVICE

Walter A. Weiss, Euclid, Ohio, assignor, by mesne assignments, to Cleveland Patents, Inc., Cleveland, Ohio, a corporation of Ohio Application August 4, 1940, Serial No. 351,373

11 Claims. (Cl. 161—15)

This invention relates to a device for measuring the time of operation of apparatus and for directly indicating the time or speed of the operation.

For the purposes of illustration the invention is described hereinafter in connection with the measurement and direct indication of shutter speeds of camera shutters, its use for other purposes being readily apparent from the illustrative example.

Heretofore the shutters of cameras have been made adjustable with respect to the speed of operation. The adjustment usually is made by shifting an adjustment lever to different positions indicated on a scale on the front or periphery of the shutter and lense housing. Because of inherent limitations in the manufacture of camera shutters in quantities, however, the actual speeds and indicated speeds do not necessarily conform with each other throughout the indicated range. The most common manner of checking shutter speeds is to photograph an object moving at a known velocity, develop the film, then calculate the shutter speed and compare it with the speed indicated by the position of the adjustment lever.

For the ordinary black and white photography, the accuracy of the shutter speed may vary somewhat from the theoretically correct speed and yet produce good results, though with color film the shutter speed must be somewhat closer to the theoretically correct speed.

One of the objects of the present invention is to provide a device for measuring shutter speeds quickly and accurately throughout as wide a range of speeds desired, for example, from speeds of 1½ seconds to 1/2500 of a second for a complete cycle of shutter operation.

Another object is to provide a simple and inexpensive device in which the speed of the shutter may be directly and accurately indicated on an electric milliampere-second meter, and which device is so arranged that the desired testing of the camera shutter can be effected readily by laymen who do not have any technical knowledge.

Another object is to provide a combination in which a power circuit to a milliampere-second meter is controlled by an electronic valve which, in turn, is controlled by a light responsive device, and wherein means are provided to render the current flow to the meter unaffected by voltage fluctuations resulting from changes in resistance of the light responsive device as it is subjected to different light intensities, whereby the meter may directly operate only in respect to duration of the time of exposure of the light responsive device to a source of light and independently of intensity of the light.

Figure 2:
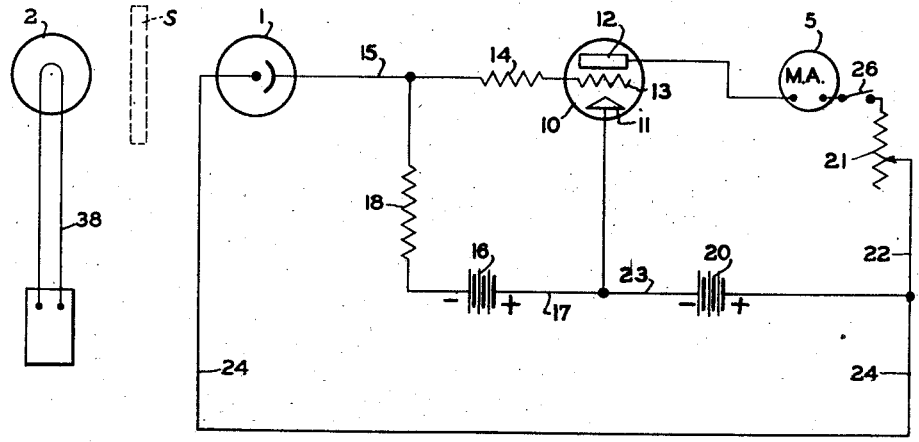

Other objects and advantages will become apparent from the following description wherein reference is made to the drawing, in which:

Fig. 1 is a plan view of the device with a camera in place for the testing of its shutter speed, and Fig. 2 is a wiring diagram illustrating the electrical elements of the device.

Referring first to Fig. 1, the device comprises generally a light responsive device 1 such, for example, as a gas or vacuum type photo-cell, and a source of light 2 which may be the ordinary electric illuminating bulb. The light responsive device 1 and source of light 2 are positioned so that a camera C may be positioned therebetween with its shutter S in a position to block the passage of light rays from the source 2 to the cell 1 when the shutter is closed, and to permit the passage of such rays when the shutter is open. To facilitate placing of the camera between the light responsive device 1 and source of light 2, they are preferably mounted so as to be exposed through the top of a suitable housing which is indicated in dot and dash lines in Fig. 1 and which contains the cooperating electrical elements and wiring of the device. The light responsive device 1 is shielded in the usual manner to exclude all light except that from the source 2.

An upright shield 3 is mounted between the light source 2 and the shutter and has a slot 4 through which a beam of light may pass from the light source 2 to the light responsive device 1. The shield may be rotated about a horizontal axis so that, in case the shutter is of the focal plane type, the shield can be adjusted to position its slots 4 parallel to the shutter opening. The rotated position of the shield slot 4 is unimportant with respect to other types of shutters.

A ballistic galvanometer 5 of the D'Arsonval type, preferably a milliampere-second meter, is provided for indicating the shutter speed or the time required for shutter operation. The meter 5 is positioned so that its indicator and scale are exposed through the top wall of the housing, as will be more fully described hereinafter.

Referring next to Fig. 2, the wiring diagram and electrical elements of the invention are illustrated. These comprise essentially an electronic valve device such as the vacuum tube 10, having the usual cathode 11, plate 12 and grid 13. The grid 13 is connected to a resistor 14 and therethrough to the cathode terminal of the light responsive device 1 by a conductor 15. The positive terminal of a direct current bias voltage source, such as the battery 16, is connected to the cathode 11 by a conductor 17 and the negative terminal of the battery 16 is connected to the grid 13 through a resistor 13 and the resistor 14. The resistor 13 is preferably of an extremely high order of resistance, for example, in the form illustrated, it may be about 20 megohms. The resistor 14 is of much lower resistance relative to the resistor 13, for example, approximately one megohm. The plate 12 of the vacuum tube 10 is connected to one terminal of a ballistic galvanometer, or the milliampere-second meter, 5. The other terminal of the meter 5 is connected to the positive terminal of a direct current voltage source such as the battery 20 through an adjustable resistor 21 and conductor 22. The negative terminal of the battery 20 is connected by a conductor 23 to the conductor 17 and therethrough to the cathode 11. The battery or bias voltage source 16 may vary from two to twenty volts depending on the type of tube or voltage required to cut off the plate current. The battery or voltage source 20 may be one hundred and fifty volts, depending on the type of tube. A conductor 24 is connected at one end to the conductor 22 and at its other end is connected to the anode terminal of the light responsive device 1 so that the resistivity of the light responsive device controls the flow of current in the circuit from the conductor 24 to the conductor 15.

A switch 26 preferably is provided between the meter 5 and the battery 20. The switch 26 is of the spring operated normally open type and must be held in closed position by the operator in order to render the device ready for operation by the light responsive device 1. Thus, the danger of leaving the meter circuit closed and causing accidental overloading of the meter is prevented.

If desired, the meter 5 may be connected between the cathode 11 and battery 20 but, because as low resistance as possible is preferable in the cathode circuit, there is some advantage in connecting the meter in the plate circuit. Since the meter 5 may be in either circuit, the words "power circuit" are used hereinafter to define the combined plate and cathode circuits and thus more generally locate the meter.

Assuming that the light source 2 is illuminated and the camera shutter S is interposed in proper position between the light source 2 and the light responsive device 1, so long as the camera shutter is closed the circuit through the conductors 15 and 24 is, in effect, open. Under these conditions, due to the energization by the bias voltage from the battery 16, the grid 13 is sufficiently negative with respect to the cathode 11 to cut off the plate current. Consequently, there is no flow of current to the grid 13 or the plate 12 and the meter 5 is therefore unenergized. When the shutter S is opened so that sufficient light from the source 2 strikes the light responsive device 1, the resulting lowered resistivity of the light responsive device 1 permits the circuit through conductors 15 and 24 to become operative and, since the positive terminal of the battery 20 is connected to the grid through the light responsive device 1 and the resistor 14, the battery 20 tends to render the grid 13 positive with respect to the cathode 11. When the grid reaches zero or becomes very slightly positive with respect to the cathode, there is a current flow from the cathode 11 to the plate 12, the negative voltage theretofore existing between the cathode 11 and grid 13 and supplied by the battery 16 through the resistor 18 being negligible. The resulting plate current energizes the milliampere-second meter 5.

Since the meter 5 is a milliampere second meter, its deflection is proportional to the plate current times the duration of the plate current or $I_p \times t$. If, therefore, $I_p$ is kept constant under the fluctuations in resistivity of the light responsive device 1, the deflection of the indicator of the meter will be directly proportional to the time and the scale used on the meter can be calibrated directly in terms of time or shutter speed.

In order to render the plate current substantially constant under voltage fluctuations resulting from exposure of the light responsive device 1 to different light intensities above the minimum light intensity required to operate the light responsive device, it is necessary, after raising the voltage of the grid 13 with respect to the cathode 11 to very slightly positive, to maintain the grid voltage at this value. Necessarily, as the current tending to flow to the grid through the resistor 14 increases, the voltage drop across the resistor 14 tends to increase proportionately and vice versa. On the other hand, the resistivity of the light responsive device 1 decreases and the current flow permitted thereby increases as the amount of the light to which the light responsive device 1 is exposed increases. The voltage drop across the light responsive device 1 necessarily increases as the resistivity increases and vice versa.

The resistance from the grid 13 to the cathode 11 of the vacuum tube 10 decreases with an increase in current in the circuit which includes the battery 20, the light responsive device 1, and the resistor 14, and consequently the I. R. drop between the grid and cathode remains substantially constant as the current in this circuit increases. So long as the resistor 14 is of sufficiently high order, the actual voltage drop from the grid to the cathode can be considered constant for the purposes of the present invention. It should be noted that the resistance from the grid to the cathode of the tube 10 is not a fixed value independently of the applied voltage or current, and if it were, the desired substantially constant characteristics would not be obtained.

These effects are taken advantage of by so relating the resistor 14 and the light responsive device 1 that the sum of the I. R. drops across the light responsive device 1 and the resistor 14 always remains substantially constant. For example, if the resistivity of the light responsive device decreases, its voltage drop decreases and a larger amount of current tends to flow through the resistor 14, but the increase in current in the resistor 14 increases the voltage drop across the resistor 14. Thus, while the voltage drop across the light responsive device 1 varies and the voltage drop across the resistor 14 varies, the total or combined voltage drop across the light responsive device 1 and the resistor 14 remains substantially constant and substantially equal to the voltage across the battery 20.

In fact the combined voltage drop is equal to the battery voltage less the very small voltage drop from the grid to the cathode of the tube 10. The value of the resistor 14 is not critical except that it must not be in excess of a value which would make the charging of the inherent capacity from the grid 13 to the cathode 11 an appreciable time factor and it must not be so low that its resistance approaches the apparent resistance from the grid to the cathode because this would permit the grid to be driven to an excess positive voltage and thereby defeat the purpose of the resistor 14 which is to limit the grid to slightly positive.

If the resistor 14 were omitted, then the amount of light acting on the light responsive device 1 would change the voltage of the grid 13 with respect to the cathode 11 and thus increase the amount of current flowing in the plate circuit in a direct proportional relationship to the amount of light striking the light responsive device 1.

As a result of the structure hereinbefore described and the relation of the light responsive device and resistor 14, the resistance between the conductors 15 and 24 can be varied from a relatively high value of approximately 15 or 20 megohms to zero without appreciable change in the relative voltage of the grid 13 with respect to the cathode 11, and therefore, without any appreciable change in the current flowing to the meter 5. The amount of substantially constant current permitted to flow through the meter 5 further may be adjusted by the resistor 21 and remains constant at any predetermined adjusted value selected.

If a number of scales are required on the same meter in order to enlarge the range, the preselected current is adjusted by the resistor 21 and a different and corresponding scale on the meter 5 is read. For example, the adjustable resistor 21 may have four points of control 30, 31, 32 and 33. The meter has a corresponding number of scales 34, 35, 36 and 37, each of which is used in conjunction with a different setting of the resistor 21, and control points 30, 31, 32 or 33. Thus for an extremely rapid camera, the resistance of the resistor 21 may be reduced so that a large amount of current can flow for the relatively short instant of time that the shutter is open and thus provide a sufficient amount of current to cause the meter to operate. On the contrary, if a very slow acting shutter is being tested, the amount of current permitted to flow may be reduced greatly by the resistor 21 so that the meter is not over-energized during the relatively longer interval during which current is applied and does not deflect off the scale.

The points or stations 30 to 33 of the adjustable resistor 21 and the scales 34 to 37 of the meter 5 may bear identifying indicia which show which point or station and which scale are to be used in conjunction. The scales 34 to 37 preferably are calibrated to read directly in terms of shutter speed in seconds or fractions thereof.

Instead of the adjustable resistor 21 a number of separate resistors, each chosen or adjusted for a given current flow, may be substituted for the adjustable resistor 21, each of the selected resistors being substituted for a different one of the control points of the adjustable resistor 21.

The electronic valve 10 is preferably a pentode type tube connected in the same manner as a triode type tube and is used because of the greater sensitivity of pentode type tubes, though in the simplified showing in Fig. 2 the electronic valve is shown as a triode type tube.

If desired, the light source 2 may be controlled by a switch 38 which is connected for concurrent operation by the switch 26 so that the operator is aware that the device is connected for operation when the light source 2 is operated. It should be noted that the light responsive device 1 must be exposed to a predetermined minimum amount of light before it is capable of changing the grid 13 from negative to zero or positive with respect to the cathode 11. Only a very small amount of light is necessary to render the light responsive device 1 capable of effecting this change, for example, a light intensity of one one-thousandth of that from the source 2 is ample. Once the light responsive device is subjected to this minimum amount of light, an increase in the light does not cause the grid voltage to increase additionally because the resistor 14 in series with the grid definitely limits the voltage on the grid 13 to the zero or predetermined slight positive value, regardless of further reduction in the resistivity of the light responsive device 1. Thus there is a slight delay in action inherent in the light responsive device due to the fact that it cannot become operative except when it receives a predetermined small, but definite minimum amount of light.

Advantage is taken of this fact in relation to the inherent limitations in shutter operation. A shutter cannot open or close instantly but, instead, the shutter opening gradually increases to a maximum then gradually decreases. If the light responsive device became operative to change the grid 13 to zero or positive with respect to the cathode 11, even when exposed to an infinitely small amount of light, the meter would register the total time during which the shutter permitted the passage of any light whatsoever. But because the shutter opening increases from zero to a maximum then gradually decreases again to zero, the total amount of light admitted by the shutter is not constant for the entire period during which the shutter is open. On the contrary, the total effective time of exposure of the film by the shutter, assuming an amount of light at all times equal to a fully open shutter, is appreciably less than the actual period of shutter operation from fully closed through fully opened back to fully closed position.

The inherent limitations in the light responsive device thus have a delayed action at the beginning of shutter operation which continues until the shutter has opened sufficiently to cause the light responsive device to render the grid zero or slightly positive with respect to the cathode. This same effect or phenomenon occurs during last stages of closure of the shutter. Thus the time registered for complete operation of the shutter, disregarding the amount of light, is less than the actual time required. However, these slight delays of the light responsive device tend to compensate for the time during which the light responsive device is rendered operative by the shutter but the shutter has not reached, or has passed, its maximum open position. A substantial balance can be obtained between the delays of the light responsive device at starting and stopping of operation and the time during which the shutter is not fully open but the light responsive device is fully operative. If desired, the scales on the meter can be calibrated to compensate fully for this difference and to indicate the time based upon a theoretically perfect shutter, affording the same total amount of light as the more gradually opening and closing shutter being tested, but admitting such light at a constant rate throughout the entire cycle of the theoretical shutter operation.

For most purposes the accuracy of the present device is sufficient without special calibration or allowance for this phenomenon.

Having thus described my invention, I claim:

1. A speed indicating device comprising a ballistic galvanometer, an electronic valve, a power circuit for connecting the galvanometer to a source of D. C. voltage through said valve, a light responsive device connected to said valve for operating the valve to render the power circuit operative with respect to the galvanometer when the light responsive device is exposed to a source of light and for operating the valve to render the power circuit inoperative with respect to the galvanometer when the light responsive device is not exposed to said source of light, and means for rendering the amount of current flowing to the galvanometer substantially constant and substantially independent of voltage fluctuations caused by the light responsive device while the power circuit is operative, whereby the galvanometer meter fluctuates in response to the duration of current and is substantially unaffected by changes in intensity of the light to which the light responsive device is subjected.

2. A speed indicating device comprising a milliampere-second meter, an electronic valve, a circuit for connecting the meter to a source of D. C. voltage through said valve, a light responsive device connected to said valve for rendering the circuit operative with respect to the milliampere-second meter when the light responsive device is exposed to a source of light and for rendering the circuit inoperative with respect to the milliampere-second meter when the light responsive device is not exposed to said source of light, means for rendering the amount of current flowing to the meter substantially constant and substantially independent of voltage fluctuations caused by the light responsive device while the circuit is operative, whereby the meter fluctuates in response to the duration of current and is substantially unaffected by changes in intensity of the light to which the light responsive device is subjected.

3. A speed indicating device comprising a ballistic galvanometer, an electronic valve, a power circuit for connecting the galvanometer to a source of D. C. voltage through said valve, a light responsive device connected to said valve for operating the valve to render the power circuit operative with respect to the galvanometer when the light responsive device is exposed to a source of light and for operating the valve to render the power circuit inoperative with respect to the galvanometer when the light responsive device is not exposed to said source of light, means for rendering the amount of current flowing to the meter substantially constant and substantially independent of voltage fluctuations caused by the light responsive device while the power circuit is operative, and means to adjust the substantially constant current effective on the galvanometer to different predetermined values, whereby the meter fluctuates substantially only in response to the duration of current and is substantially unaffected by changes in intensity of the light to which the light responsive device is subjected.

4. A speed indicating device comprising a ballistic galvanometer, an electronic valve, a power circuit for connecting the galvanometer to a source of D. C. voltage through said valve, a light responsive device connected to said valve for operating the valve to render the power circuit operative with respect to the galvanometer when the light responsive device is exposed to a source of light and for operating the valve to render the power circuit inoperative with respect to the galvanometer when the light responsive device is not exposed to said source of light, means for rendering the amount of current flowing to the galvanometer substantially constant and substantially independent of voltage fluctuations caused by the light responsive device while the power circuit is operative, means to adjust the substantially constant current effective on the galvanometer to different predetermined values, and said galvanometer having a plurality of time scales, each of which is calibrated for a different one of said adjusted current values, whereby the galvanometer fluctuates substantially only in response to the duration of current and is substantially unaffected by changes in intensity of the light to which the light responsive device is subjected.

5. A speed indicating device comprising a ballistic galvanometer, an electronic valve, a circuit for connecting the galvanometer to a source of D. C. voltage through said valve, a light responsive device connected to said valve for rendering the circuit operative with respect to the galvanometer when the light responsive device is exposed to a source of light and for rendering the circuit inoperative with respect to the galvanometer when the light responsive device is not exposed to said source of light, and resistor means electrically connected between the light responsive device and valve for rendering the amount of current flowing to the meter substantially constant and substantially independent of voltage fluctuations caused by the light responsive device while the circuit is operative, whereby the meter fluctuates substantially only in response to the duration of current and is substantially unaffected by changes in intensity of the light to which the light responsive device is subjected.

6. A speed indicating device comprising a ballistic galvanometer, a circuit for connecting the galvanometer to a source of power, an electronic valve connected in said circuit for controlling the flow of current from the source to the galvanometer, a light responsive device connected to said electronic valve for operating the valve to control the circuit in response to the light responsive device, a resistor connected between and in series with the valve and the light responsive device, and means for connecting the valve to a biasing source of voltage.

7. A speed indicating device comprising a ballistic galvanometer, a circuit for connecting the galvanometer to a D. C. voltage source, an electronic valve connected in said circuit for controlling the flow of current from the source to the galvanometer, a light responsive device having its cathode terminal connected to the grid of said electronic valve and its anode terminal connected to the positive terminal of the source of D. C. voltage, a resistor connected in series between the grid and the cathode terminal of the light responsive device, a biasing resistor connected in series with the negative terminal of the biasing source of direct current voltage and the cathode of the light responsive device between the cathode and first mentioned resistor, and a conductor connecting the positive terminal of the biasing source of direct current voltage to the cathode of the electronic valve.

8. A speed indicating device comprising a ballistic galvanometer, a power circuit for connecting the galvanometer to a direct current voltage source, an electronic valve connected in said circuit for controlling the flow of current from said source to the galvanometer, a resistor, a light responsive device having its cathode terminal connected to the grid of said electronic valve through said resistor and having its anode terminal connected to a positive terminal of said circuit, the electronic valve having its cathode connected to a negative terminal of said circuit, a relatively higher resistance resistor connected in series between the negative side of a biasing source of direct current voltage and the cathode of the light responsive device between said cathode and the first mentioned resistor, and means connecting the positive side of the biasing source of direct current voltage to the cathode of the electronic valve.

9. A speed indicating device comprising a ballistic galvanometer, an electronic valve, a power circuit for connecting the galvanometer and valve together and to a source of current, a light responsive device operatively connected to said valve for operating the valve, said light responsive device having resistivity inversely related to the intensity of light to which the light responsive device is exposed, whereby the valve would be operated to cause a fluctuating voltage in said circuit due to fluctuations in intensity of light to which the light responsive device may be subjected, resistor means connected in series with the cathode of the light responsive device and the grid of said valve, said light responsive device and resistor means being related to the characteristics of the valve so that the total voltage drop across the valve is substantially constant and thereby controls the valve to limit the current flow to the galvanometer to a substantially constant amount and substantially independent of current fluctuations caused by the light responsive device.

10. A speed indicating device comprising a ballistic galvanometer, a power circuit for connecting the galvanometer to a D. C. voltage source, an electronic valve connected in said circuit for controlling the flow of current from said source to the galvanometer, a resistor, a light responsive device having its cathode terminal connected to the grid of said electronic valve through said resistor and having its anode terminal connected to a positive terminal of said circuit, the electronic valve having its cathode connected to a negative terminal of said circuit, a relatively higher resistance resistor, and means connecting the grid of said electronic valve to the positive terminal of a biasing source of D. C. voltage through both of said resistors in series.

11. A speed indicating device comprising a ballistic galvanometer, a power circuit for connecting the galvanometer to a D. C. voltage source, an electronic valve connected in said circuit for controlling the flow of current from the source to the galvanometer, a light responsive device having its cathode terminal connected to the grid of said electronic valve and its anode terminal connected to the positive side of said circuit, a resistor connected in series between the grid and the cathode terminal of the light responsive device, a biasing source of D. C. current connected to said electronic device, said light responsive device having its resistivity variable in inverse relation to the intensity of light to which it is subjected, and the resistivity of the resistor being of such value that the voltage drop between the grid and cathode of the valve remains substantially constant and thereby the plate current of the valve remains substantially constant under fluctuations in the resistivity of the light responsive device.

WALTER A. WEISS.